United States Patent [19]

Tahara et al.

[11] Patent Number: 4,688,235

[45] Date of Patent: Aug. 18, 1987

[54] CROSS-POLARIZATION INTERFERENCE CANCELLER

[75] Inventors: Masato Tahara; Tooru Matsuura; Toshihiko Ryu, all of Tokyo, Japan

[73] Assignee: NEC Corporation, Japan

[21] Appl. No.: 803,132

[22] Filed: Nov. 27, 1985

[30] Foreign Application Priority Data

Nov. 30, 1984 [JP] Japan .................................. 59-252893
May 29, 1985 [JP] Japan .................................. 60-115735
May 29, 1985 [JP] Japan .................................. 60-115736

[51] Int. Cl.[4] ............................................. H04B 1/10
[52] U.S. Cl. ..................................... 375/102; 455/60; 370/6
[58] Field of Search .......................... 375/96, 99, 102; 455/60, 63, 295, 305, 306; 370/6; 343/361, 362

[56] References Cited

U.S. PATENT DOCUMENTS

| 4,100,376 | 7/1978 | Woythaler | 455/60 |
| 4,112,370 | 9/1978 | Monsen | 370/6 |
| 4,220,923 | 9/1980 | Pelchat et al. | 455/60 |
| 4,313,220 | 1/1982 | Lo et al. | 455/60 |
| 4,321,705 | 3/1982 | Namiki | 455/295 |
| 4,479,258 | 10/1984 | Namiki | 455/60 |
| 4,577,330 | 3/1986 | Kavehrad | 375/102 |

Primary Examiner—Robert L. Griffin
Assistant Examiner—Stephen Chin
Attorney, Agent, or Firm—Laff, Whitesel, Conte & Saret

[57] ABSTRACT

In order to reset a cross-polarization interference canceller for use in a digital radio communications receiver, two polarized-signal discriminators are provided in a manner to be coupled respectively to receive reproduced digital data from the corresponding demodulators. In the event that the demodulator produces an output not characteristic thereof, the corresponding polarized-signal discriminator produces a reset signal to reset the canceller.

11 Claims, 11 Drawing Figures

CROSS-POLARIZATION INTERFERENCE CANCELLER

BACKGROUND OF THE INVENTION

1. Field of the Invention

This invention relates to a cross-polarization interference canceller for use in a digital radio communications receiver which is supplied with dual, independent input signals.

2. Description of the Prior Art

The crowding of the frequency spectrum in a radio communications system has led to an extremely limited availability of transmission channels. A known approach to solving this problem is the use of the two orthogonally polarized waves for doubling the capacity of the radio communications system.

Under normal circumstances cross-polarization effects, i.e. the effects of interference between such orthogonally polarized signals, are sufficiently low to result in overall good performance. However, when poor propagation conditions exist, such as during heavy rain, or when the signals travel through a multipath communication medium, the cross-polarization interference effects tend to increase and the two signals are not easily isolated merely on the basis of polarization. In order to reduce or cancel the cross-polarization interference, various cancellers have been proposed.

The canceller, in general, does not operate properly in the event that a demodulator generates abnormal outputs due to carrier-wave async caused by fading (for example). Further, when a proper transmission path is re-established due to extinction of fading, the canceller does not quickly regains to its normal operation. Viz., the convergence process of the canceller is delayed.

A known approach to solving these difficultes is that when poor signal reception is detected, the cross-polarization interference canceller is reset using a carrier-wave async signal obtained from a demodulator(s).

Before discussing the present invention in detail, reference will be made to FIGS. 1 and 2. FIG. 1 is a block diagram showing a known resettable canceller together with associated circuiry, which generally comprises dual, independent input terminals 10 and 12 for respectively receiving horizontally and vertically polarized IF (Intermediate Frequency) signals IFh and IFv, two resettable variable couplers 14 and 16, two subtracters 18 and 20, two demodulators 22 and 24, two control signal generators 26 and 28, an OR gate 30, two output terminals 33 and 35, all of which are coupled as shown. Each variable coupler (14 or 16) is of a transversal filter type as shown in FIG. 2.

The control signal generator 26 includes a correlator 32 and an integrator 34, while the other control signal generator 28 similarly includes a correlator 36 and an integrator 38. The independent signals IFh and IFv are respectively applied to the input terminals 10, 12 from separate receiving sections (not shown).

It should be noted that the canceller generally includes the two symmetrical sections arranged for removing contaminating components from the two incoming IF signals, and hence only one symmetrical section will be referred in detail throughout this specification.

As shown in FIG. 1, the signal IFh is fed to the variable coupler 14 and also to the subtracter 18. The subtracter 18 subtracts the output of the variable coupler 16 from the signal IFh in order to reduce or cancel the components of the other signal IFv deteriorating IFh. Following this the subtracter 18 applies the output thereof to the demodulator 22, which produces a digital data signal D1, an error signal E1, a carrier-wave async signal AS1, and a clock signal CK1 reproduced from the recieved IF signal. Similarly, the demodulator 24 produces a digital data signal D2, an error signal E2, a carrier-wave async signal AS2, and a clock signal CK2. The error and data signals E1, D2 are correlated, using the clock signal Ck1, at the correlator 32 which applies a correction signal 40 to the integrator 34. The integrator 34 outputs a control signal 42 which is used to control the variable coupler 16. In a similar manner, the error and data signals E2, D1 are correlated, using the clock signal CK2, at the correlator 36 which applies a correction signal 44 to the integrator 38. The integrator 38 produces a control signal 46 by which the variable coupler 14 is controlled.

FIG. 2 is a block diagram showing a known transversal filter used as the variable coupler 14 (or 16). The transversal filter is a three-tap type for purposes of simplicity. It should be noted that the same device can be utilized in each of the preferred embodiments of this invention.

The FIG. 2 block diagram, which is assumed to be the variable coupler 14 in this instance, comprises an input terminal 50 to which the incoming signal IFh (FIG. 1) is applied, two delay circuits 52 and 54, six tap weighting circuits $56a$ through $56f$, two summing circuits 58 and 60, a 90°-directional coupler 62 whose output is coupled to the subtracter 20 (FIG. 1), and a controller 64. This controller 64 is supplied with the control signal 46 from the integrator 38, and outputs tap coefficient control signals $I_{-1}$, $R_{-1}$, $I_0$, $R_0$, $I_{+1}$ and $R_{+1}$ which are respectively applied to the tap weighting circuits $56a$–$56f$. The controller 64 also receives the output of the OR gate 30 and is reset in response thereto. The operation of the transversal filter shown in FIG. 2 is well known in the art and hence the details thereof will be omitted for brevity.

Turning back to FIG. 1, in the event that the incoming signal IFh lowers in level due to fading (for example) to an extent that the corresponding demodulator 22 is unable to reproduce a carrier-wave, then the demodulator 22 outputs the carrier-wave async signal AS1 which is applied, via the OR gate 30, to the controller 64 (FIG. 2). The controller 64 is responsive to the signal AS1 resetting the tap weighting circuits $56a$–$56f$ by allowing each circuit to produce its output with a minimum value. It is clear that when one of the async signals AS1 and AS2 is outputted, both of the variable couplers 14 and 16 are reset.

The above-mentioned prior art, however, has encountered a drawback in that if (a) the incoming signal IFh is lowered and (b) a cross-polarization interference is sufficiently high to an extent that the level of the signal IFh is below that of the cross-interfering signal IFv at the input of the demodulator 22, then the demodulator 22 demodulates the signal IFv instead of IFh. Consequently, the demodulator 22 does not output the async signal AS1 in that it normally operates as a demodulator itself. This means that the variable couplers 14 and 16 can not be reset, which leads to the situation wherein the canceller of the FIG. 1 arrangement does not function. Further, the FIG. 1 prior art has encountered a further problem in that when the transmission path is restored to its normal condition, it does not provide a fast convergence process for cancelling the interference.

Reference has been made concentrating on the case where the signal IFh is lowered and cross-interfered by IFv, but same discussion is applicable to the reverse case, i.e., the signal IFv is lowered due to fading and cross-polarized by IFh.

Another prior art, disclosed in Japanese laid open patent application (or Patent Application First Provisional Publication) No. 59-77734, has proposed a method of cancelling the cross-polarization interference. In accordance with this method, if the demodulator provided for an interfering transmission path is unable to reproduce the carrier-wave, the canceller is reset in response to the carrier-wave async signal obtained from the demodulator in question. This prior art further discloses another method, in which the data reproduced at the demodulator of the interfering transmission path is checked in connection with a bit error rate. If the bit error rate exceeds a predetermined value, the canceller is reset. This prior art, however, has encountered difficulties. First, in the case where the canceller is reset in response to the carrier-wave async signal, the normally operated demodulator of the interferred tansmission path tends to be forced into the carrier-wave async state due to the cross-interference before resetting the canceller. On the other hand, where the bit error rate is employed, the canceller is reset and maintained at this state irrespective of the fact that the interfering side demodulator is still able to operate normally.

SUMMARY OF THE INVENTION

It is therefore a primary object of this invention to provide a cross-polarization interference canceller free from the difficulties inherent in the above-mentioned prior art.

The another object of this invention is to provide a cross-polarization interference canceller which is provided with two polarized-signal discriminators each of which is coupled to the corresponding demodulator in order to overcome the difficulty discussed with reference to FIG. 1.

Still another object of this invention is to provide a cross-polarization interference canceller which enables the demodulator of cross-interfered transmission path to be normally operated until the canceller is reset, and which prolongs the canceller reset as long as the cross-interfering transmission path side demodulator operates normally.

Still another object of this invention is to provide a cross-polarization interference canceller which includes a high-speed flip-flop for improving the cancellation operation.

A first aspect of this invention takes the form of a cross-polarization interference canceller for use in a digital radio communications receiver, comprising: first and second variable couplers for receiving respectively first and second IF signals which are orthogonally polarized with respect to each other; a first subtracter to which the first IF signal and the output of the second variable coupler are applied; a second subtracter to which the second IF signal and the output of the first variable coupler are applied; a first demodulator demodulating the output of the first subtracter, and producing first error and data signals; a second demodulator demodulating the output of the second subtracter, and producing second error and data signals; a first control signal generator receiving the first error signal and the second data signal to correlate same, and controlling the second variable coupler; a second control signal generator receiving the second error signal and the first data signal to correlate same, and controlling the first variable coupler; a first polarized-signal discriminator for determining if the first demodulator demodulates the first data signal, and for resetting at least the first variable coupler in the event that the first polarized-signal discriminator fails to determine that the first demodulator demodulates the first data signal; and a second polarized-signal discriminator for determining if the second demodulator demodulates the second data signal, and for resetting at least the second variable coupler in the event that the second polarized-signal discriminator fails to determine that the second demodulator demodulates the second data signal.

A second aspect of this invention takes the form of a cross-polarization interference canceller for use in a digital radio communications receiver, comprising: first and second variable couplers for receiving respectively first and second IF signals which are orthogonally polarized with each other; a first subtracter to which the first IF signal and the output of the second variable coupler are applied; a second subtracter to which the second IF signal and the output of the first variable coupler are applied; a first demodulator demodulating the output of the first subtracter, and producing first error and data signals; a second demodulator demodulating the output of the second subtracter, and producing second error and data signals; a first control signal generator receiving the first error signal and the second data signal to correlate same, and controlling the second variable coupler; a second control signal generator receiving the second error signal and the first data signal to correlate same, and controlling the first variable coupler; a first bit error rate detector coupled to the output of the first demodulator, and receiving the first data signal to detect a bit error rate thereof; a first reset signal generator which receives the output of the first bit error rate detector and which also receives two carrier-wave async signals respectively applied from the first and second demodulators, the first reset signal generator applying a first reset signal to the second control signal generator which controls the first variable coupler in response to the first reset signal; a second bit error rate detector coupled to the output of the second demodulator, and receiving the second data signal to detect a bit error rate thereof; and a second reset signal generator which receives the output of the second bit error rate detector and which also receives the two carrier-wave async signals, the second reset signal generator applying a second reset signal to the first control signal generator which controls the second variable coupler in response to the second reset signal.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 3:
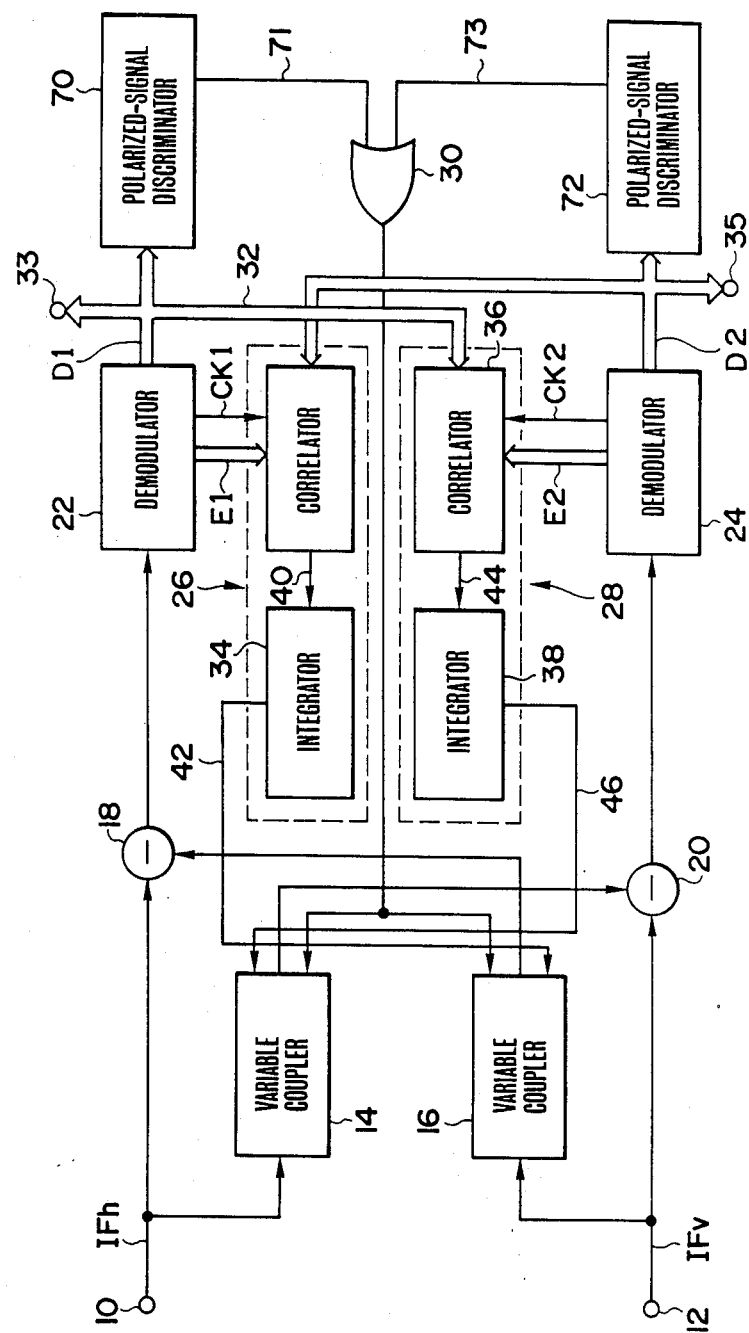
FIG. 3 is a block diagram of a first embodiment of the cross-polarization interference canceller according to this invention.

Reference is now made to FIG. 3 wherein the first embodiment of this invention is illustrated.

Figure 1:
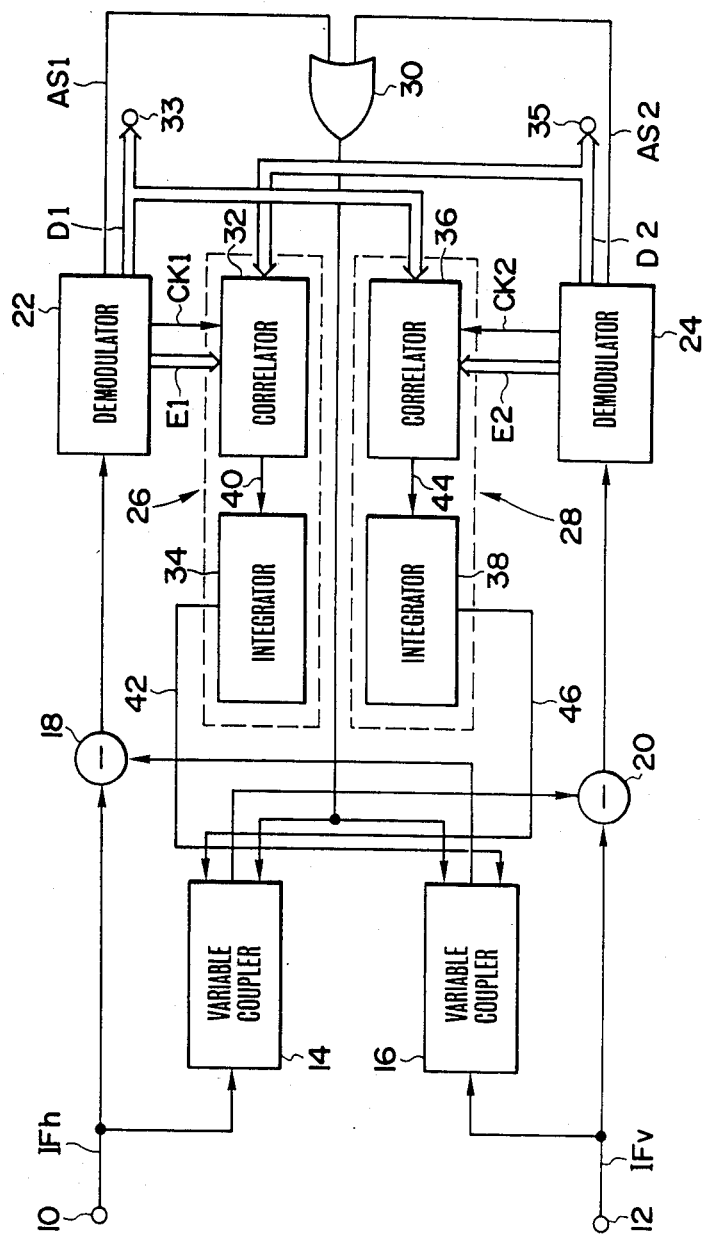
FIG. 1 is a block diagram showing the prior art cross-polarization interference canceller discussed in the opening paragraphs of the instant disclosure.
Figure 2:
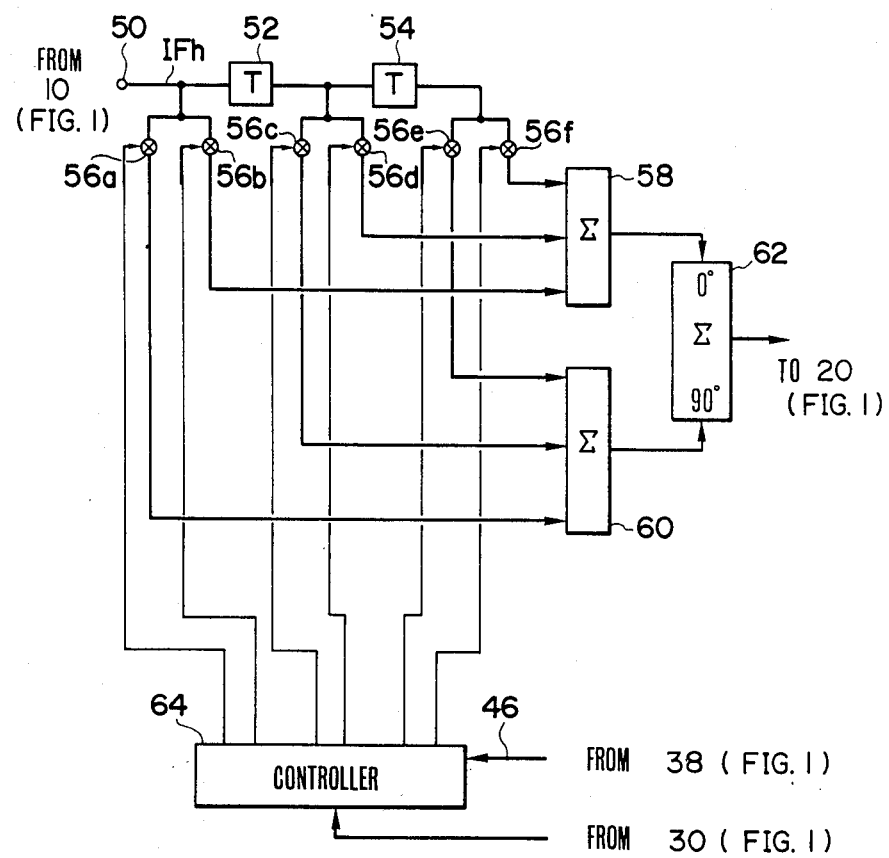
FIG. 2 is a block diagram of a portion forming part of the FIG. 1 block diagram.

The cross-polarization interference canceller shown in FIG. 3 is identical to that of FIG. 1 except that the former arrangement further includes two polarized-signal discriminators 70 and 72 which are arranged between the corresponding demodulators and the OR gate 30. Each of the discriminators 70 and 72 has an identical circuit configuration.

More specifically, the discriminator 70 has its input and output terminals respectively coupled to the output of demodulator 22 and to the input of the OR gate 30. Similarly, the other discriminator 72 has its input and output terminals respectively coupled to the output of demodulator 24 and to the input of the OR gate 30.

The polarized-signal discriminator 70 is supplied with the digital data signal D1, and discriminates whether the received signal D1 is in fact the demodulated signal of the incoming IFh. In the event that the received signal D1 is the demodulated signal of IFv instead of IFh, the discriminator 70 produces a reset signal 71 which is applied, via the OR gate 30, to the variable couplers 14 and 16. Similarly, the other discriminator 72 produces a reset signal 73 if the demodulator 24 demodulates the incoming signal IFh instead of IFv. Discriminating the received data signals D1 (or D2), is implemented, by way of example, such that the frame sync signals reproduced at the demodulator 22 and 24 are rendered different. It should be noted that the variable couplers 14 and 16 can concurrently be reset when one of the demodulators 22, 24 is unable to reproduce the carrier-wave.

The other portions of the FIG. 3 block diagram have been described with reference to FIG. 1 so that they will not be referred to for simplicity.

It is understood that a feature of the first embodiment shown in FIG. 3 is that it can be reset if (a) one incoming IF signal is lowered in level and (b) the cross-polarization interference is high to an extent that the level of the one incoming IF signal is lowered considerably relative to that of the other incoming IF signal at the input of the demodulator provided for the first mentioned incoming IF signal.

The first embodiment shown in FIG. 3 can be modified such that the discriminators 70 and 72 independently reset the variable couplers 14 and 16 respectively. In this case the OR gate 30 is omitted.

Figure 4:
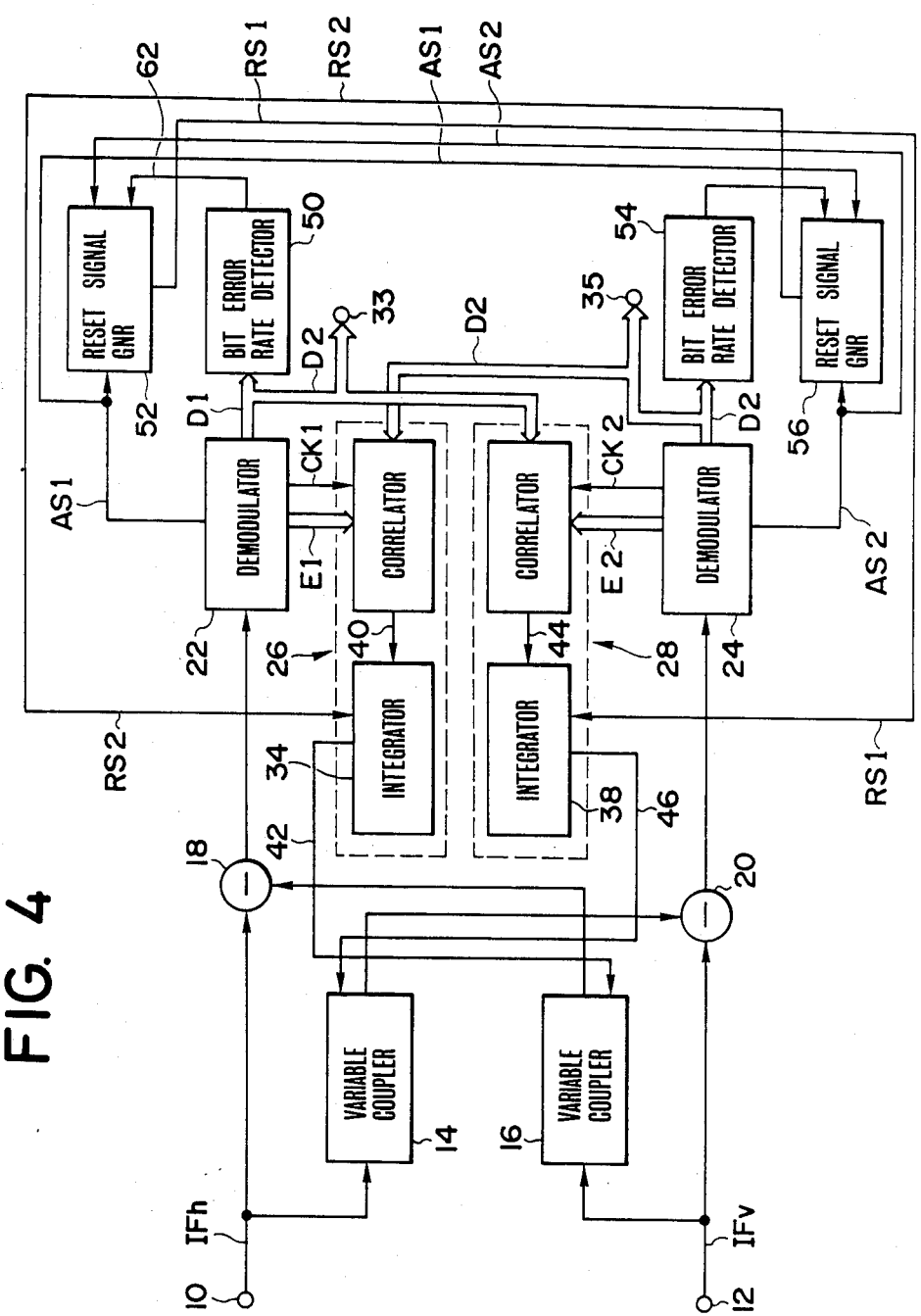
FIG. 4 is a block diagram of a second embodiment of the cross-polarization interference canceller according to this invention.

FIG. 4 show a second embodiment of this invention. This second embodiment is identical to that of FIG. 3 except that the former arrangement lacks the polarized-signal discriminators 70 and 72, and, instead thereof, is provided with two bit error rate detectors 50, 54 and two reset signal generators 52, 56, as shown.

The bit error rate detector 50 receives the data signal D1 from the demodulator 22, and allows its output 62 to assume a logic "1" if the bit error rate exceeds a predetermined value. Otherwise the signal 62 assumes a logic "0". The signal 62 is applied to the reset signal generator 52 to which the carrier-wave async signals AS1 and AS2 are also applied. Each of the signals AS1 and AS2 assumes a logic "1" when the corresponding demodulator 22 (or 24) is unable to reproduce the carrier wave, and assumes a logic "0" while the corresponding demodulator operates normally. On the other hand, in order to reset the variable couplers 16 and 14, each of the reset signals RS1 and RS2 changes its logic value from "1" to "0", respectively.

Figure 5:
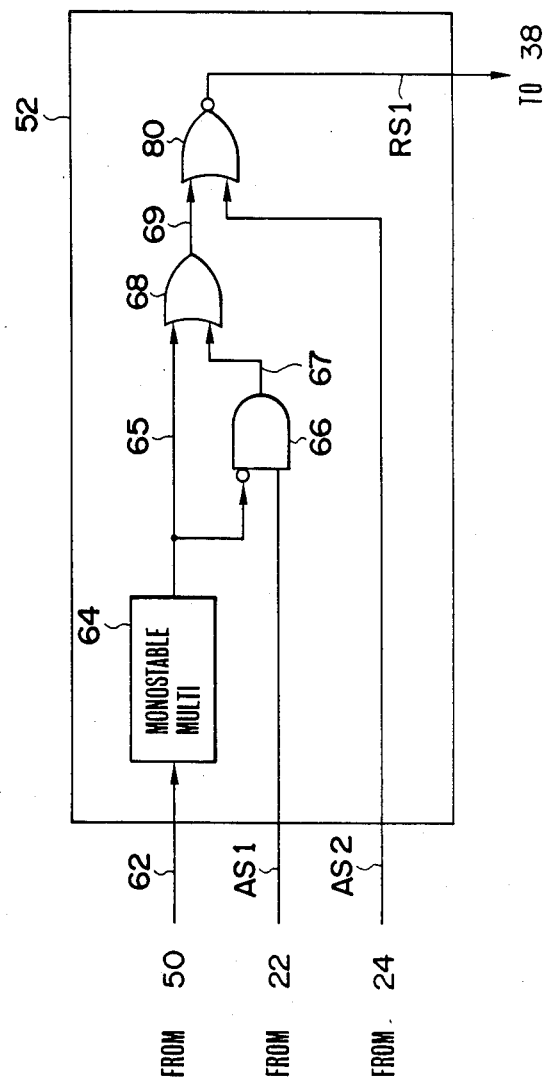
FIG. 5 is a block diagram of a portion forming part of the FIG. 4 block diagram.
Figure 6:
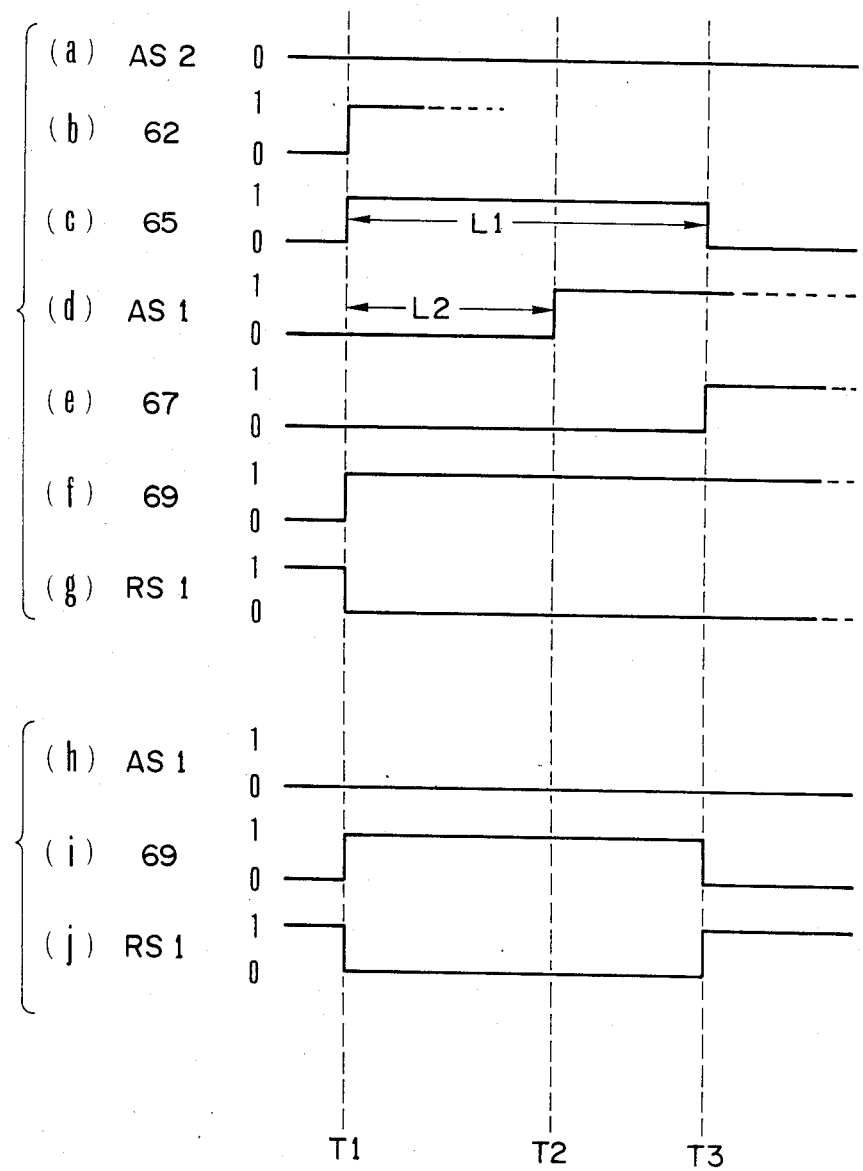
FIGS. 6 and 7 are timing charts for explaining the operation of the block diagrams shown in FIGS. 4 and 5.
Figure 7:
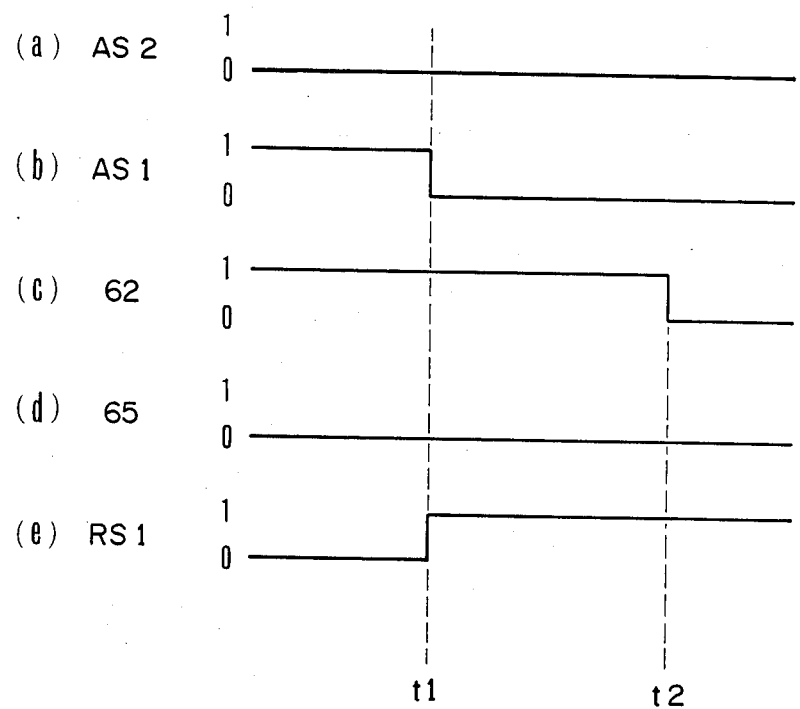

The operation of the FIG. 4 arrangement will be discussed with reference to FIGS. 5, 6 and 7. FIG. 5 is a block diagram showing in detail the reset signal generator 52 (or 54), while FIGS. 6 and 7 are timing charts of the signals applied to and derived from the generator 52.

As shown in FIG. 5, the reset signal generator 52 comprises a monostable multivibrator 64 to which the signal 62 is applied, an AND gate 66, an OR gate 68 and a NOR gate 80, all of which are coupled as shown. The AND gate 66 receives an inverted signal at one input terminal thereof, while receiving the signal AS1 from the demodulator 22 at the other input terminal. The NOR gate 80 receives the output signal 69 of the OR gate 68 and the signal AS2 and applies the signal RS1 to the integrator 38.

Assuming that the carrier-wave async signal AS2 is maintained at a logic "0" (FIG. 6(a)), which means the demodulator 24 operates normally. When the incoming signal IFh begins to fall in level due to fading (for example), the bit error rate becomes high. If the bit error rate increases up to a predetermined value, the signal 62 is allowed to assume a logic "1" (FIG. 6(b)) at time point T1 before the signal AS1 turns to a logic "1". In response to the change from "0" to "1" of the signal 62, the one-shot multivibrator 64 outputs a logic "1" for a predetermined time duration L1 (FIG. 6(c)), resulting in the fact that the reset signal RS1 changes from a logic "1" to "0" and remains thereat at least for the time interval L1 (FIG. 6(g)). The integrator 38 is responsive to the reset signal RS1 outputting the control signal 46 which terminates the variable coupler 14 to produce its output. The time duration L1 is previously determined to be longer than a time interval L2 shown in FIG. 6(d). The time interval L2 is defined from T1 to a time point when the signal AS1 assumes a logic "1" (T2). As a consequence, if the signal AS1 assumes a logic "1" at time point T3, the reset signal RS1 is maintained at a logic "0" (FIG. 6(g)) in that at this time point the output signal 65 of the monostable multivibrator 64 assumes a logic "0". FIGS. 6(e) and 6(f) shows timing charts of the signals 67 and 69, respectively.

If the variable detector 14 is reset after the demodulator 22 becomes unable to reproduce the carrier-wave as mentioned with reference to the prior art, then there is an undesirable possibility that the normally operated demodulator 24 is rendered incapable of reproducing the carrier-wave. This is because the data signal D1 contains no received information, so that the variable coupler 14 no longer produces an output for cancelling the cross-interference and moreover tends to increase the interference effects.

Whilst, according to this invention, when the demdoulator 22 is unable to reproduce the carrrier-wave at time point T3, the variable coupler 14 has already been reset at time point T1 by detecting the bit error rate exceeding the predetermined value. Thus, the difficulty inherent in the prior art can be removed.

On the other hand, under the circumstance that the demodulator 22 continues to properly reproduce the carrier-wave to allow the signal AS1 to assume a logic "0" as shown in FIG. 6(h), if the signal 65 assumes a logic "1" (FIG. 6(c), then variable coupler 14 is reset. However, the variable coupler 14 restores its normal operation after the predetermined time duration L1. This means that the canceller does not continue to be reset. This advantage is not obtained from the prior art as mentioned previously.

FIG. 7 shows timing charts which depict another operation of the second embodiment (FIGS. 4 and 5) when the incoming signal IFh recovers its normal level. Also in this case it is assumed that the signal AS2 remains a logic "0" (FIG. 7(a)). When the level of the incoming signal IFh increases up to a normal level due to the extinction of fading, the demodulator 22 begins to reproduce the carrier-wave and hence the logic level of the signal AS1 changes from "1" to "0" at time point t1. Thereafter, the logic level of the signal 62 changes from "1" to "0" at time point t2. Since the signal 65 remains at a logic "0" (FIG. 7(d)), the reset signal RS1 changes from a logic "0" to "1" at time point t1 and hence the reset condition is released. Consequently, upon the demodulator 22 restoring normal operation, the canceller begins to function without waiting for the bit error rate to lower. It follows that the arrangement shown in FIG. 4 is able to provide fast convergence.

On the contrary, when the demodulator 24 is brought into a carrier-wave async state while the demodulator 22 operates normally, the signal AS2 changes from a logic "0" to "1". Consequently, the reset signal RS1 assumes a logic "0" and hence resets the variable coupler 14. Thus, the variable coupler 14 ceases to apply its output to the subtracter 20. Resetting the variable coupler 14 under the above circumstances, features fast recovery of the demodulator 24. This is because the output of the variable coupler 14 is unstable until the demodulator 24 restores its normal operation and hence causes a delay of the restoration of the demodulator 24.

Figure 5A:
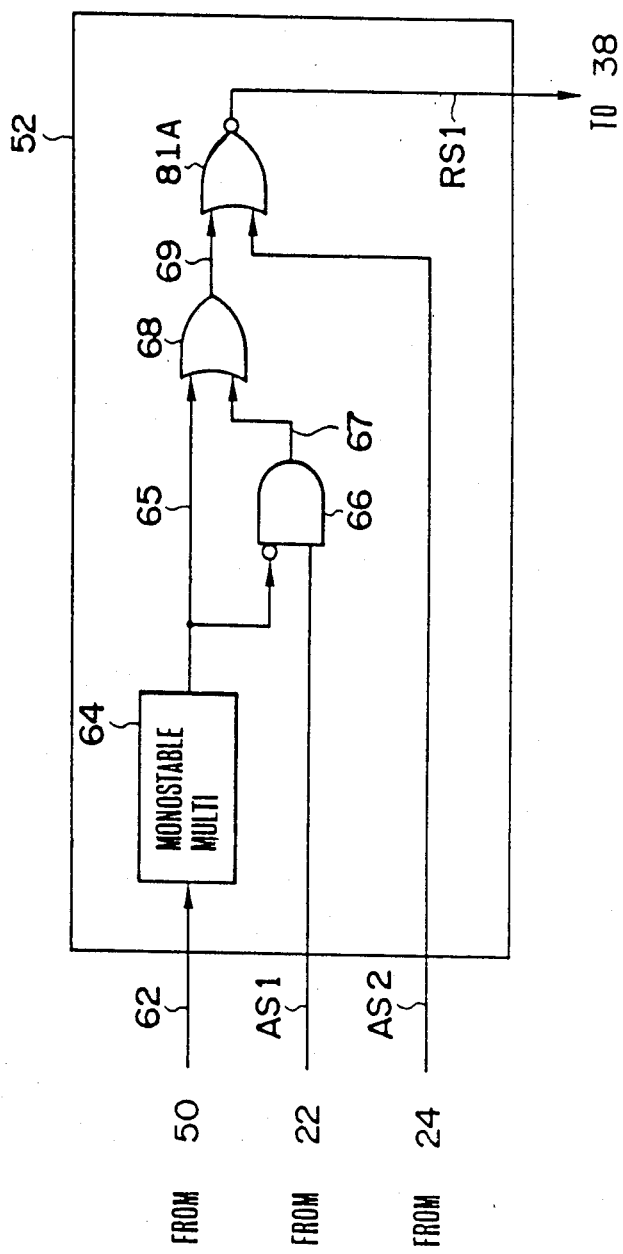
FIG. 5A is a block diagram of a modification of the FIG. 5 arrangement.

It will be appreciated that the NOR gate 80 can be readily replaced with an OR gate 81A, as shown in FIG. 5A if so desired. However, under such circumstances the control signal generators 26, 28 need be adapted to be responsive to a signal of opposite polarity.

Figure 8:
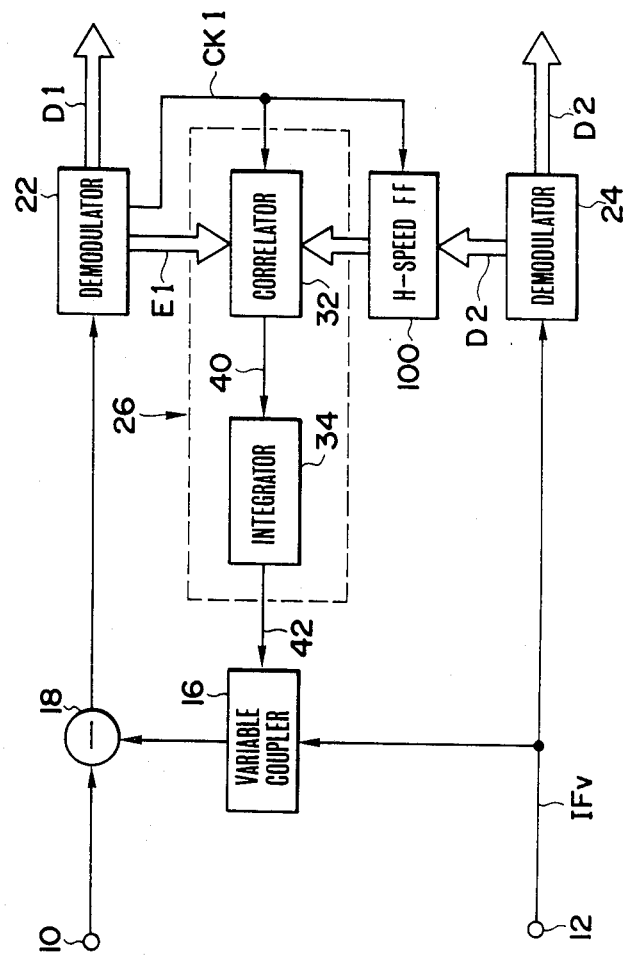
FIG. 8 is a block diagram of a third embodiment of this invention.

Reference is made to FIG. 8, in which a third embodiment of this invention is shown in block diagram form. This embodiment is directed to improve the characteristics of the canceller by adding a high-speed flip-flop. This high-speed flip-flop is provided for extracting the error or data signals before correlating them.

The arrangement of FIG. 8 includes, for purposes of simplicity, only a portion for cancelling the components of the incoming signal IFv which cross-interfers the other signal IFh, and is identical to that of the FIG. 3 arrangment except that a high-speed type flip-flop 100 is added between the correlator 32 and the demodulator 24.

It is known that the correlator 32 includes a flip-flop (not shown) for use in extracting error and data signals to correlate them. Howevever, only low-speed type flip-flops have been employed in the prior art, resulting in the difficulty mentioned below.

The incoming signals IFh and IFv are independently transmitted through differing path lengths. Therefore, the data transient points of the bit stream reproduced from the signal IFh, are usually different in time from those of the bit stream reproduced from the other signal IFv. Consequently, there is an uncertain time period during which the flip-flop can not extract the error and data signals E1, D2 at the same time. It follows that if the flip-flop provided in the correlator 32 is a slow-speed type, then the uncertain time period becomes large. The possibility that the signals E1 and D2 can not be extracted simultaneously, lessens the cancellation capability.

Figure 10:
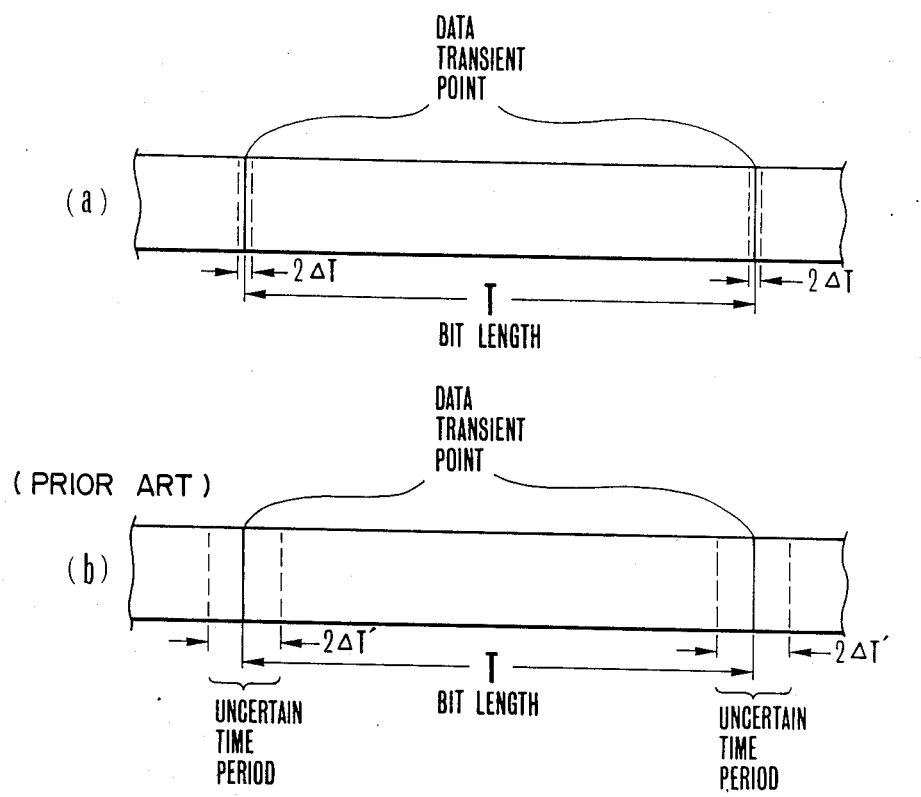
FIG. 10 are diagrams for explaining the block diagrams of FIGS. 8 and 9 in comparison with the prior art.

FIG. 10 illustrates schematically the uncertain time periods each of which centers around a data transient point, in which FIG. 10(a) is for this invention while FIG. 10(b) is for the prior art.

Returning to FIG. 8, the clock signal CK1 is applied to the correlator 32 and also to the high-speed flip-flop 100. The data signal D2 is extracted using the clock signal CK1 at the flip-flop 100, and is applied to the correlator 32. The correlator 32 extracts the error signal E1 using a relatively slow-speed flip-flop (not shown) using the same clock signal CK1, and then correlates the signals E1 and D2. It is therefore understood that according to the FIG. 8 arrangement, the uncertain time period can be narrowed relative to the case where the signals E1 and D2 are extracted by a slow-speed flip-flop at the correlator 32.

Figure 9:
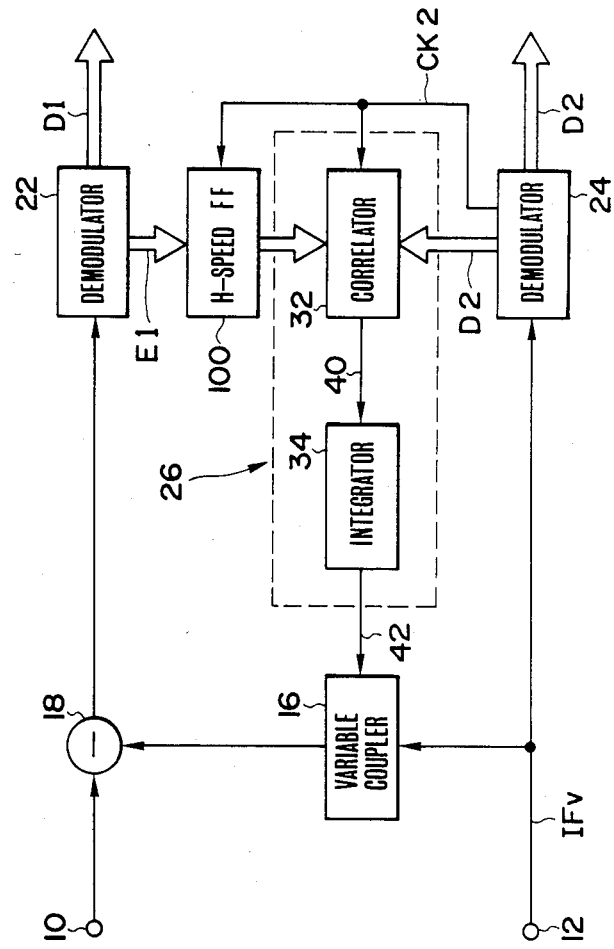
FIG. 9 is a block diagram of a modification of the third embodiment.

FIG. 9 is a modification of the arrangement shown in FIG. 8. The modification includes the high-speed flip-flop 100 arranged between the demodulator 22 and the correlator 32 in order to extract the error signals E1 using the clock signal CK2. It is clear that this modification has the same effects as the FIG. 8 arrangement.

The foregoing description shows only preferred embodiments of the present invention. Various modifications are apparent to those skilled in the art without departing from the scope of the present invention which is only limited by the appended claims.

What is claimed is:

1. A cross-polarization interference canceller for use in a digital radio communications receiver, comprising:
    first and second variable couplers (14), (16) for receiving respectively first and second IF signals which are orthogonally polarized with respect to each other;
    a first subtracter (18) to which said first IF signal and the output of said second variable coupler are applied;
    a second subtracter (20) to which said second IF signal and the output of said first variable coupler are applied;
    a first demodulator (22) demodulating the output of said first subtracter, and producing first error and data signals;
    a second demodulator (24) demodulating the output of said second subtracter, and producing second error and data signals;

a first control signal generator (26) receiving said first error signal and said second data signal to correlate same, and controlling said second variable coupler;

a second control signal generator (28) receiving said second error signal and said first data signal to correlate same, and controlling said first variable coupler;

a first polarized-signal discriminator (70) for determining if said first demodulator demodulates said first data signal, and for resetting at least said first variable coupler in the event that said first polarized-signal discriminator fails to determine that said first demodulator demodulates said first data signal; and a second polarized-signal discriminator (72) for determining if said second demodulator demodulates said second data signal, and for resetting at least said second variable coupler in the event that said second polarized-signal discriminator fails to determine that said second demodulator demodulates said second data signal.

2. A cross-polarization interference canceller as claimed in claim 1, further comprising an OR gate (30) which has two input terminals respectively coupled to receive the outputs of said first and second polarized-signal discriminators, and which has one output terminal coupled to apply the output thereof to said first and second variable couplers.

3. A cross-polarization interference canceller as claimed in claim 1, in which said first control signal generator includes a first correlator, and further comprising a high-speed flip-flop (100), the input of which is coupled to said second demodulator and the output of which is coupled to said first correlator, to extract said second data signal using a clock signal applied from said first demodulator.

4. A cross-polarization interference canceller as claimed in claim 1, in which said first control signal generator includes a first correlator, and further comprising a high-speed flip-flop (100), the input of which is coupled to said first demodulator and the output of which is coupled to said first correlator, to extract said first error signal using a clock signal applied from said second demodulator.

5. A cross-polarization interference canceller as claimed in claim 1, in which said first control signal generator includes a first correlator, and further comprising a high-speed flip-flop (100), the input of which is coupled to said second demodulator and the output of which is coupled to said first correlator, to extract said second data signal using a clock signal applied from said first demodulator.

6. A cross-polarization interference canceller for use in a digital radio communications receiver, comprising:
   first and second variable couplers (14), (16) for receiving respectively first and second IF signals which are orthogonally polarized with each other;
   a first subtracter (18) to which said first IF signal and the output of said second variable coupler are applied;
   a second subtracter (20) to which said second IF signal and the output of said first variable coupler are applied;
   a first demodulator (22) demodulating the output of said first subtracter, and producing first error and data signals;
   a second demodulator (24) demodulating the output of said second subtracter, and producing second error and data signals;
   a first control signal generator (26) receiving said first error signal and said second data signal to correlate same, and controlling said second variable coupler;
   a second control signal generator (28) receiving said second error signal and said first data signal to correlate same, and controlling said first variable coupler;
   a first bit error rate detector (50) coupled to the output of said first demodulator, and receiving said first data signal to detect a bit error rate thereof;
   a first reset signal generator (52) which receives the output of said first bit error rate detector and which also receives two carrier-wave async signals respectively applied from said first and second demodulators, said first reset signal generator applying a first reset signal to said second control signal generator which controls said first variable coupler in response to said first reset signal;
   a second bit error rate detector (54) coupled to the output of said second demodulator, and receiving said second data signal to detect a bit error rate thereof; and
   a second reset signal generator (56) which receives the output of said second bit error rate detector and which also receives said two carrier-wave async signals, said second reset signal generator applying a second reset signal to said first control signal generator which controls said second variable coupler in response to said second reset signal.

7. A cross-polarization interference canceller as claimed in claim 6, wherein said first reset signal generator comprises:
   means coupled to receive the output of said first bit error rate detector which triggers said means into an unstable state for a predetermined time period;
   an AND gate which receives the output of said means and the carrier-wave async signal from said first demodulator;
   a first OR gate which receives the outputs of said means and said AND gate; and
   a second OR gate which receives the output of said first OR gate and the carrier-wave async signal from said second demodulator, the output of said second OR gate corresponding to said first reset signal.

8. A cross-polarization interference canceller as claimed in claim 6, wherein said first reset signal generator comprises:
   means coupled to receive the output of said first bit error rate detector which triggers said means into an unstable state for a predetermined time period;
   an AND gate which receives the output of said means and the carrier-wave async signal from said first demodulator;
   an OR gate which receives the outputs of said means and said AND gate; and
   an NOR gate which receives the output of said OR gate and the carrier-wave async signal from said second demodulator, the output of said NOR gate corresponding to said first reset signal.

9. A cross-polarization interference canceller as claimed in claim 6, wherein said second reset signal generator comprises:
   means coupled to receive the output of said second bit error rate detector which triggers said means into an unstable state for a predetermined time period;

an AND gate which receives the output of said means and the carrier-wave async signal from said second demodulator;

an OR gate which receives the outputs of said means and said AND gate; and an NOR gate which receives the output of said OR gate and the carrier-wave async signal from said first demodulator, the output of said NOR gate corresponding to said first reset signal.

10. A cross-polarization interference canceller as claimed in claim 6, wherein said second reset signal generator comprises:

means coupled to receive the output of said first bit error rate detector which triggers said means into an unstable state for a predetermined time period;

an AND gate which receives the output of said means and the carrier-wave async signal from said first demodulator;

a first OR gate which receives the outputs of said means and said AND gate; and a second OR gate which receives the output of said first OR gate and the carrier-wave async signal from said second demodulator, the output of said second OR gate corresponding to said first reset signal.

11. A cross-polarization interference canceller as claimed in claim 6, in which said first control signal generator includes a first correlator, and further comprising a high-speed flip-flop (100), the input of which is coupled to said first demodulator and the output of which is coupled to said first correlator, to extract said first error signal using a clock signal applied from said second demodulator.

* * * * *